US007367048B2

United States Patent
Kelley et al.

(10) Patent No.: US 7,367,048 B2
(45) Date of Patent: Apr. 29, 2008

(54) APPARATUS AND METHOD FOR AUTONOMIC EMAIL ACCESS CONTROL

(75) Inventors: Edward E. Kelley, Wappingers Falls, NY (US); Tijs Y. Wilbrink, Voorburg (NL); Ellis Zijlstra, Haarlem (NL)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 10/604,316

(22) Filed: Jul. 10, 2003

(65) Prior Publication Data

US 2005/0010799 A1    Jan. 13, 2005

(51) Int. Cl.
| | |
|---|---|
| G06F 7/04 | (2006.01) |
| G06F 17/30 | (2006.01) |
| G06K 9/00 | (2006.01) |
| H04L 9/32 | (2006.01) |
| H04L 9/00 | (2006.01) |
| H04N 7/16 | (2006.01) |
| G06F 15/16 | (2006.01) |
| G06F 7/00 | (2006.01) |
| H04K 1/00 | (2006.01) |

(52) U.S. Cl. .............................. 726/2; 726/27; 726/28; 726/29; 709/202; 709/206; 709/207; 705/59; 707/9; 707/10

(58) Field of Classification Search ................ 709/207, 709/206; 726/2, 27, 28, 29; 707/9, 10; 705/59
See application file for complete search history.

(56) References Cited

U.S. PATENT DOCUMENTS

| | | | |
|---|---|---|---|
| 5,787,175 A | 7/1998 | Carter | |
| 5,958,005 A * | 9/1999 | Thorne et al. | 709/202 |
| 6,212,534 B1 | 4/2001 | Lo et al. | |
| 6,357,010 B1 | 3/2002 | Viets et al. | |
| 2003/0149732 A1* | 8/2003 | Peled et al. | 709/206 |
| 2004/0019644 A1* | 1/2004 | Fellenstein et al. | 709/206 |
| 2004/0186894 A1* | 9/2004 | Jhingan et al. | 709/207 |
| 2005/0038750 A1* | 2/2005 | Cahill et al. | 705/59 |

FOREIGN PATENT DOCUMENTS

| | | |
|---|---|---|
| WO | WO 99/27503 | 6/1999 |
| WO | WO 00/57605 | 9/2000 |

\* cited by examiner

*Primary Examiner*—Ayaz Sheikh
*Assistant Examiner*—Shin-Hon Chen
(74) *Attorney, Agent, or Firm*—DeLio & Peterson, LLC; Robert Curcio; Jay H. Anderson

(57) ABSTRACT

A software application and corresponding architecture to implement the application that dynamically updates the access control list and keeps track of the distribution routes of a document in a repository where the document is built and accessed through usage of a common email system. The access control list and distribution routes are built by tracking recipients of the email message linked to the document. Some recipients can be disabled by the originator from forwarding the referenced databases within the emailed document, while others may designate further transmissions to selected persons or groups.

15 Claims, 14 Drawing Sheets

DB Request Table

| Data Base | Data Base Server | Addressee | Type of Access Control |
|---|---|---|---|
| DB 1 | Address 1 | Name 1 | View |
| DB 1 | Address 1 | Name 2 | View |
| DB 1 | Address 1 | Name 3 | Edit |
| DB 2 | Address 2 | Name 1 | Author |
| DB 2 | Address 2 | Name 1 | Edit |
| DB 2 | Address 2 | Name 2 | Author |
| DB 2 | Address 2 | Name 3 | View |
|   |   |   |   |

FIG. 4

APPARATUS AND METHOD FOR AUTONOMIC EMAIL ACCESS CONTROL

BACKGROUND OF INVENTION

The present invention relates to a computer implemented method for controlling communication between networks and among a plurality of users, specifically, sharing of documents while controlling access to databases referenced in the documents, and maintaining an accessible record of all recipients of the shared document.

Sharing of information in the current environment of systems is dependent on the proprietor of the information. In order to make the information available to a widely dispersed public, the proprietor will need to submit the information to a central repository. Work groups are common in the corporate environment, and the sharing of group information is a successful component of the work group dynamic. Work group documents may contain any combination of text, numbers, computer program source code, computer hardware schematics or layouts, database records, database references, digitized audio, digitized video, digitized visual images, or other digital information. The availability of this information is dependent somewhat upon the availability of the repository and the awareness of other people having access to the repository. Generally, when submitting to a widely available repository, the originator or proprietor does not have complete control over the access to the submitted information. Secrecy controls, when applicable, attempt to allow members of the work group to review and edit the documents while preventing such access by others outside the group.

Access control lists have been introduced to enhance security control measures. System users are assigned to one or more groups by a system administrator, and an access list, which matches groups with access rights, is associated with documents in the computer system. Going one step further, some work groups encrypt their documents. In an encrypted form, the documents cannot be understood. An encryption "key" is required to decrypt the document. In U.S. Pat. No. 5,787,175 issued to Carter on Jul. 28, 1998, entitled, "METHOD AND APPARATUS FOR COLLABORATIVE DOCUMENT CONTROL," a combination of public-key cryptographic methods, symmetric cryptographic methods, and message digest generation methods are used for controlling collaborative access to a work group document. Users who are currently members of a collaborative group can readily access the information, while users who are not currently members of the group cannot. Although access control is defined, an automated method of notifying the originator and acquiring the originator's approval for access to the referenced databases identified within the originator's document to forwarded recipients of the document is not disclosed or taught. Nor is the tracking path of the shared document retained or filed for later inspection by the originator.

In U.S. Pat. No. 6,356,010 issued to Viets, et al., on Mar. 12, 2002, entitled, "SYSTEM AND METHOD FOR CONTROLLING ACCESS TO DOCUMENTS STORED ON AN INTERNAL NETWORK," a system for limiting access from an external network to documents stored on an internal network is taught. A client list is built in which each client is assigned to one or more roles. Each role has access to one or more documents. A requested document is compared to the document list associated with the client's role, and if the requested document is in the list of documents available to the client in the client's role, the requested document is retrieved. Again, an automated method of notifying the originator and acquiring the originator's approval for access to the referenced databases identified within the originator's document to forwarded recipients of the document is not disclosed or taught. Nor is the tracking path of the shared document retained or filed. Thus, the originator does not have the ability to learn of those interested in his or her work.

Under these control access schemes, even when information is available in a central database, a user's attention is not automatically drawn to the value of this information. Nor is the originator's attention drawn to the information needs of others reviewing the document, which would provide insight as to the valued perception attributed by the document reviewers.

In U.S. Pat. No. 6,212,534 issued to Lo, et al., on Apr. 3, 2001, entitled, "SYSTEM AND METHOD FOR FACILITATING COLLABORATION IN CONNECTION WITH GENERATING DOCUMENTS AMONG A PLURALITY OF OPERATORS USING NETWORKED COMPUTER SYSTEMS," document information relating to documents being generated is stored along with a user module; the document information including both document structure and document content. The user module includes a whiteboard display module to display a whiteboard to a user, selectively displaying document structure and content. Notecards are assigned to associate documents in a hierarchical organization, and stored separately from each other. Each notecard represents and effectively contains a content item, which may be used in a document. Lo, however, does not teach or disclose the tracking path of the shared document retained or filed for later inspection by the originator. Moreover, any comments made by an operator regarding a specific document are performed and retained on an associated notecard that is displayed on the separate whiteboard.

Bearing in mind the problems and deficiencies of the prior art, it is therefore an object of the present invention to provide an apparatus and method for autonomic email access control of shared documents.

It is another object of the present invention to provide an apparatus and method for autonomic email access control of shared documents that maintain the tracking path of the shared document retained or filed for later inspection by the originator.

A further object of the invention is to provide an apparatus and method for autonomic email access control of shared documents that allows the originator to assign access authorization for database links within a document, and expand the review of the shared information.

It is yet another object of the invention to provide an apparatus and method for autonomic email access control of databases links referenced within shared documents to allow the originator to assign access information regarding referenced databases within an emailed document.

Still other objects and advantages of the invention will in part be obvious and will in part be apparent from the specification.

SUMMARY OF INVENTION

The above and other objects and advantages, which will be apparent to one of skill in the art, are achieved in the present invention, which is directed to, in a first aspect, a method of autonomic building and updating access control for referenced databases in documents sent via email by an originator to addressees, comprising: dynamically updating an access control list of the addressees for the originator of the email; tracking distribution routes of the documents in a repository; and providing a request to the originator and a response from the originator to any of the addressees for approving, altering, or rejecting the access of said referenced databases in said documents. The method further comprises building and accessing the document through usage of a common email system, and tracking recipients of the email that are linked to the document. The method includes generating a database request table including identifying database servers, addressees, and types of access control. The types of access control include view, edit, author functions, or an access denied function. Providing the request to the originator includes having the originator receive the request in the form of an email that provides a mechanism for approving, rejecting, or altering each access control list for each new addressee, and building an appropriate database transaction for each database server. The method further comprises determining whether the addressees and access requests for each of the addressees match the access control list within each of the databases, and updating the access control list to match the database transaction.

The method further includes the deployment of the process software, the deployment comprising: installing the process software on at least one server; identifying server addresses for users accessing the process software on the at least one server; installing a proxy server if needed; sending the process software to the at least one server via a file transfer protocol, or sending a transaction to the at least one server containing the process software and receiving and copying the process software to the at least one server's file system; accessing the process software on a user's client computer file system, or sending the process software to users via email; and executing the process software by the users. The step of installing the process software further comprises: determining if programs will reside on the at least one server when the process software is executed; identifying the at least one server that will execute the process software; and transferring the process software to the at least one server's storage. The step of accessing the process software includes having the at least one server automatically copying the process software to each client computer, running an installation program at each client computer, and executing the installation program on the client computer. Sending the process software to the users via email further comprises identifying the users and addresses of the client computers. Executing the process software by the users includes sending the process software to directories on the client computers.

The method comprises the integration of process software for updating access control for referenced databases in documents sent via email by an originator to addressees, the integration comprises: determining if the process software will execute on at least one server; identifying the at least one server address, including checking the at least one server for operating systems, applications, network operating systems, or version numbers for validation with the process software, and identifying any missing software applications that are required for integration; updating the operating systems, the applications, or the network operating systems that are not validated for the process software, and providing any of the missing software applications required for the integration; identifying client addresses and checking the client's computers for operating systems, applications, network operating systems, or version numbers for validation with the process software, and identifying any missing software applications that are required for integration; updating the client's computers with the operating systems, the applications, or the network operating systems that are not validated for the process software, and providing any of the missing software applications required for the integration; and installing the process software on the client's computers and the at least one server.

The method may further comprise on demand sharing of process software for updating access control for referenced databases in documents sent via email by an originator to addressees, the on demand sharing comprising: creating a transaction containing unique customer identification, requested service type, and service parameters; sending the transaction to at least one main server; querying the server's central processing unit capacity for adequate processing of the transaction; and allocating additional central processing unit capacity when additional capacity is needed to process the transaction, and sending the additional central processing unit capacity to the server, or checking environmental capacity for processing the transaction, including network bandwidth, processor memory, or storage, and allocating the environmental capacity as required. The method further includes recording usage measurements including network bandwidth, processor memory, storage, or the central processing unit cycles. The method may also comprise summing the usage measurements, acquiring a multiplicative value of the usage measurements and unit costs, and recording the multiplicative value as an on demand charge to a requesting customer. Moreover, the method may include posting the on demand charge on a web site if requested by the requesting customer, or sending the demand charge via email to the requesting customer's email address. In addition, the method may include charging the on demand charge to the requesting customer's account if an account exists and the requesting customer selects a charge account payment method.

The method includes deploying, accessing, and executing process software for updating access control for referenced databases in documents sent via email by an originator to addressees through a virtual private network, the method further comprising: determining if the virtual private network is required; checking for remote access of the virtual private network; if the remote access does not exist, identifying a third party provider to provide secure, encrypted connections between a private network and remote users, identifying the remote users, and setting up a network access server for downloading and installing desktop client software for remotely accessing the virtual private network; accessing the process software; transporting the process software to the remote user's desktop; and executing the process software on the remote user's desktop.

The method of deploying, accessing, and executing process software through the virtual private network further includes: determining if the virtual private network is available for site-to-site access, or installing equipment required to establish the site-to-site virtual private network, and installing large scale encryption into the virtual private network; and accessing the process software on the site-to-site configuration. The step of accessing the process software further comprises dialing into the network access server or attaching directly via a cable or DSL modem into the network access server.

In a second aspect, the present invention is directed to a method of autonomic building and updating access control of referenced databases on documents shared via email, comprising: selecting a list of addressees in an email transmission to give access to the referenced databases; selecting the type of access for the selected list of addressees; constructing an email transaction to send to an originator, the email transaction including database and access requests for each of the addressees; constructing database transactions to send to database servers; sending the database transactions to the database servers; matching the list of addressees and access requests to an access control list in the database; sending the email transaction to the addressees; requesting forwarding approval by the addressees of the referenced databases from the originator; transmitting a forwarding approval or rejection from the originator to the addressee; and tracing email forwarding for the originator. Selecting the type of access further comprises providing a menu for the originator of the email transmission. Constructing the email transaction to send to the originator further comprises sending the transaction to the originator for access approval or rejection of the referenced databases. The database transactions comprise information from a database request table. The database servers process database access requests. The access control list is updated if the match is not complete. The method further comprises having the tracing of email include names and email addresses of any addressee.

In a third aspect, the present invention is directed to a program storage device readable by a machine, tangibly embodying a program of instructions executable by the machine to perform method steps for building and updating access control for referenced databases in documents sent via email by an originator to addressees, the method steps comprising: dynamically updating an access control list of the addressees for the originator of the email; tracking distribution routes of the documents in a repository; and providing a request to the originator and a response from the originator to any of the addressees for approving, altering, or rejecting the forwarding of the referenced databases in the documents. The program storage device further comprises the method steps of building and accessing the document through usage of a common email system, tracking recipients of the email that are linked to the document, and having the originator receive the request in the form of an email that provides a mechanism for approving, rejecting, or altering each access control list for each new addressee. The program storage device further includes the method step of building an appropriate database transaction for each database server.

In a fourth aspect, the present invention is directed to a program storage device readable by a machine, tangibly embodying a program of instructions executable by the machine to perform method steps for building and updating access control for referenced databases in documents sent via email by an originator to addresses, the method steps comprising: selecting a list of addressees in an email transmission to give access to the referenced databases; selecting the type of access for the selected list of addressees; constructing an email transaction to send to an originator, the email transaction including database and access requests for each of the addressees; constructing database transactions to send to database servers; sending the database transactions to the database servers; matching the list of addressees and access requests to an access control list in the database; sending the email transaction to the addressees; requesting forwarding approval by the addressees of the referenced databases from the originator; transmitting a forwarding approval or rejection from the originator to the addressee; and tracing email forwarding for the originator. The program storage device further comprises the method steps of sending the transaction to the originator for access approval or rejection, and administering access approval for viewing, editing, or administrating the referenced databases.

BRIEF DESCRIPTION OF DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 4 is a sample database request table.

DETAILED DESCRIPTION

Figure 1:
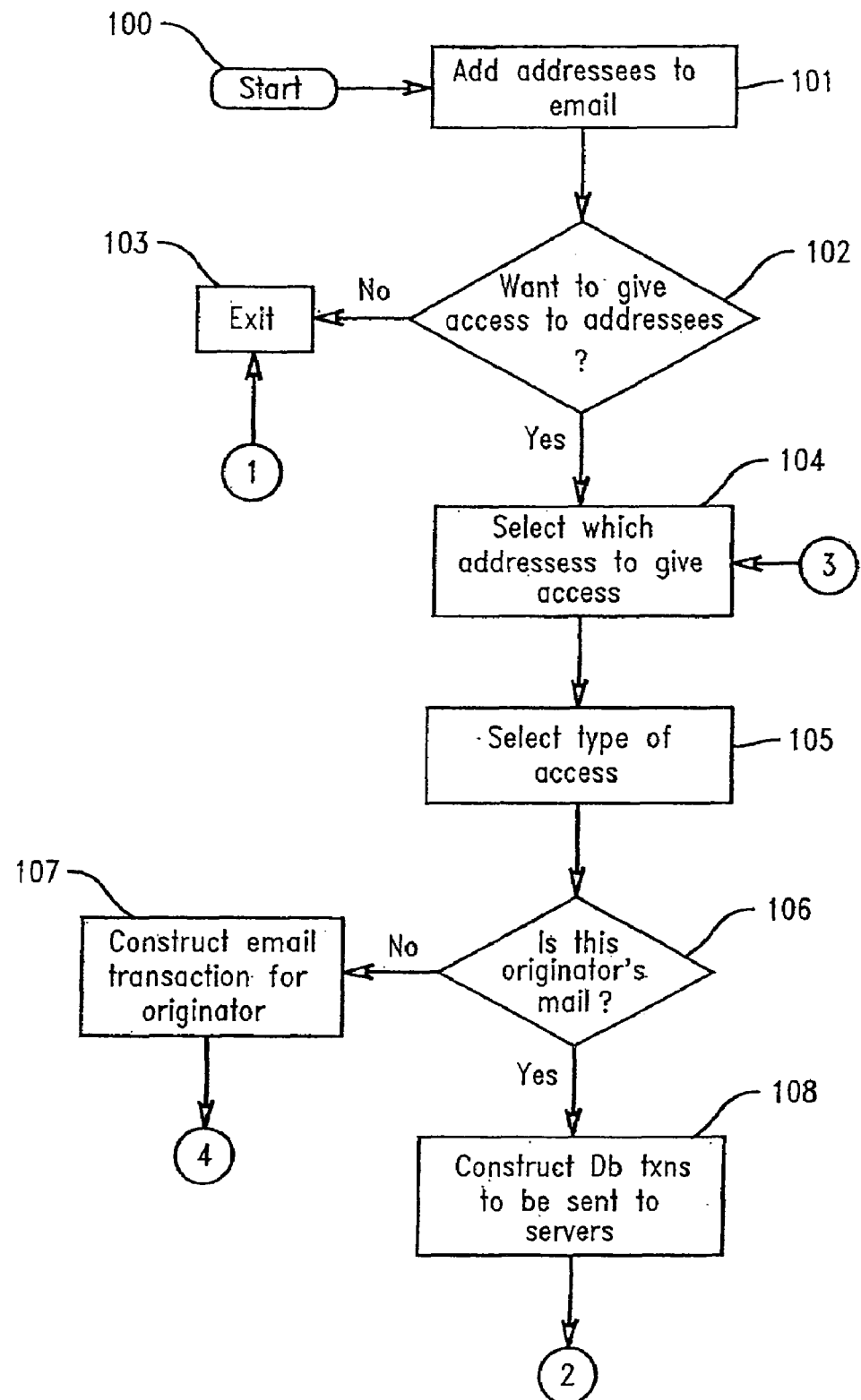
FIG. 1 is a flowchart of the application process.

In describing the preferred embodiment of the present invention, reference will be made herein to FIGS. 1-9 of the drawings in which like numerals refer to like features of the invention. Features of the invention are not necessarily shown to scale in the drawings.

The present invention defines a software application and corresponding architecture to implement the application that dynamically updates the access control list for databases referenced within a document, and keeps track of the distribution routes of the document in a knowledge repository where the document is built and accessed through usage of a common email system. The access control list and distribution routes are built by tracking recipients of the email message linked to the document. Some recipients may be disabled by the originator from having access to the document links within the document, while others may designate with the originator's approval of access for selected persons or groups.

The software may be implemented in numerous software languages that are compatible with the system hardware, and is not limited to any one particular software language. Moreover, various hardware schemes may be constructed to implement the application software, such that the process is not limited to a singular, specific hardware configuration.

By way of example, the workings of the instant invention can be summarized using the following application scenario. An originator of a company confidential document works on-site at one of the company's facilities. The originator has a document containing links to databases that explain or provide important information regarding a proposed system, which he would like to share with anyone in the organization that is interested and has a bonafide need to know. Unfortunately, the originator himself is only aware of his direct colleagues who would be interested in the document. He is unaware of others throughout the organization, including those off-site, that may have a need for his proposed system, may be in a position to provide direct input to his proposal, or may simply be interested in a collateral manner in his design by for example a marketing department, an investment decision board, or other such collaterally interested parties. The originator sends the document to his team of direct colleagues via email. Since the originator would like to share the linked databases within the document with others, and control the access to the linked databases within the document, he identifies and allows only certain individuals of those to whom he first sent the document to have the authority to access the linked databases within the document. After one of the first tier recipients reviews the document, the first tier recipient may forward it on to others, the second tier recipients. Importantly, the second tier recipients must receive the access authority from the originator to view the database links within the document. Some recipients may not have this access authority and will be denied by the system if they attempt to access the database links within the document.

For those first tier recipients with authority from the originator to access database links within the document, the documents may be forwarded with a request from the first tier recipients to the originator to allow access authority to the selected second tier recipients. Thus, the second tier of recipients may or may not have the authority to access the linked databases referenced within the document. This access authority allows recipients to view the linked databases only at the discretion of the originator. Moreover, the second tier recipients may also forward the document with the same restrictions on access authority to the database links, where knowledge and approval of the originator is required for viewing the databases. Through this access control, individuals and groups, not at first known to the originator as being interested reviewers, may view the referenced databases through secured channels based on the originator's selection of recipients and those the originator authorizes for access to the referenced databases within the document. Importantly, the originator reviews and acknowledges authority for access to the referenced databases for every potential recipient including those outside his own direct group of interested people. The originator also determines which repository the document should be submitted. The forwarding of the document with access control for the database links by the originator allows for other attention to be drawn to the document outside the originator's initial group and the originator's initial awareness.

After waiting a period of time, for example a couple of days, the originator may decide to trace his document. This will allow him to know which persons, departments, or organizations have been exposed to the document, and those who may have been provided access authority to the referenced databases within the document. Before the originator develops his document further, he is able to view the information provided along with the trace. This information includes identification of people and groups who can support him to further develop his document and bring it to the attention of key decision makers.

Figure 2:
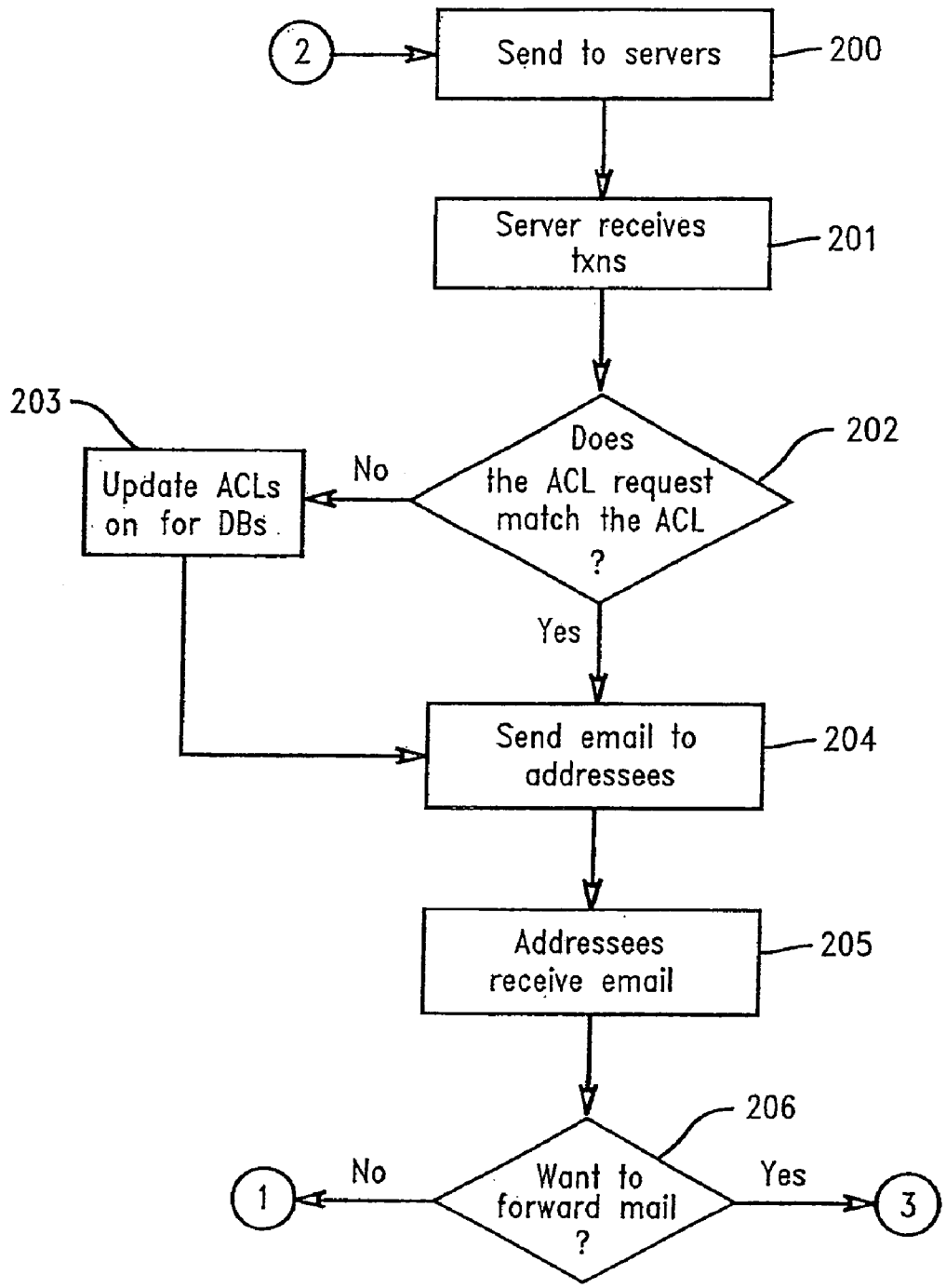
FIG. 2 is a continuation of the flowchart of FIG. 1 of the application process.
Figure 3:
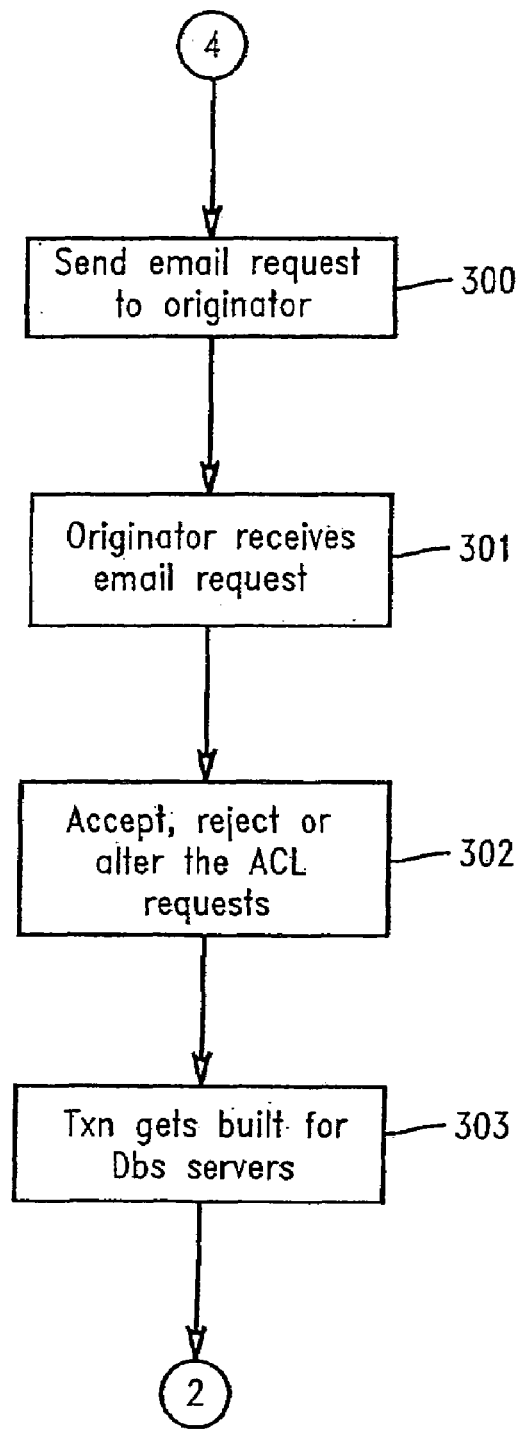
FIG. 3 is a continuation of the flowchart of FIG. 1 of the application process.

FIGS. 1-3 depict the application flow for the present invention. Referring to FIG. 1, the process commences 100 by having the originator add addresses for first tier recipients 101 to an email that has database links attached thereto. The originator is the first person to construct the email, and is the first person to distribute the email. The originator must first decide whether to give access to the databases 102 to the first tier addressees on the email for the database links included therein. If the originator does not authorize access to any of the first tier recipients, this application exits 103 since the originator is not interested in tracing the document or allowing this set of addressees to view the referenced databases. If the originator decides to give certain first tier recipients access to the databases linked in the document, he would select which recipients are authorized to view selected linked databases from the list of addressees 104. The list of databases is accessed after addressing the email. The application software of the present invention makes a menu available on request that contains the list of addressees, available databases, and the choice of access type to give each addressee for each database 105. The choices include, but are not limited to, view, edit, audit, and various other administrative functions. The originator's name and address is automatically placed in the header of the email. All of this information is placed in a database request table, and the database request table is then placed in the header of the email. A sample database request table is illustrated in FIG. 4. Once the original email is entered into the system, the application software checks to see if it is the first time this email is being distributed 106, i.e., if it came directly from the originator. If it is the first time for distribution 108, database transactions are then constructed and sent to the database servers. The database transactions contain the information from the database request table. If it is not the first time of distribution, an email transaction is constructed for the originator 107. This is a transaction containing database and access requests for each second tier addressee that is sent to the originator for his approval. The database transactions contain the same information supplied in the database request table. When an email transaction is constructed for the originator, an email request is sent to the originator 300, as depicted in FIG. 3. Addressees who wish to have others gain access to the databases send the email transaction to the originator for approval. The address of the originator is taken from the previously saved address in the header of the email sent to the addressees. The originator receives the request 301 in the form of an email that provides a mechanism to approve, reject, or alter each access control list for each of the new addressees 302. The application then builds the appropriate transactions for the database servers 303.

As shown in FIG. 2, for first time distributions, the database transactions are sent to the database servers, which will process the database access requests 200. The servers receive the transactions sent from the sender of the email 201, and processed by the database servers. This processing determines whether the list of addressees and the access requests for each addressee match the access control list (ACL) for each database 202. If a complete match cannot be made, the access control list is updated to match the database transaction 203. The email is then sent to the addressees 204. Once the addressees receive the email 205, the application of the present invention allows these first tier recipients to forward the email to a new list of addressees or second tier recipients while notifying and requesting the originator for access authorization of the linked database references within the emailed document for selected second tier addressees. If no forwarding is performed, the application exits 103. Else, the application loops back to have the originator select which addressees to give access 104. Importantly, the originator is selecting which second tier addressees to give access to the database references within the document; the first tier recipient recommends which recipient should have access, but does not give authorization. The originator becomes aware of the forwarding when asked to authorize access to the referenced databases within the document. Through this process, the originator relies upon the first tier recipients to recommend the dissemination of the information in the databases to those that the first tier recipients decide have a need to know, would benefit from the information, or could provide insightful comment.

FIG. 4 depicts an illustrative database request table for the present invention. Two databases are shown with associated database servers. Addressees are given individual access by the originator as requested. The originator has the ability to limit the access to the referenced databases. For example, some recipients are entitled only to view the information, while others may edit.

Figure 5:
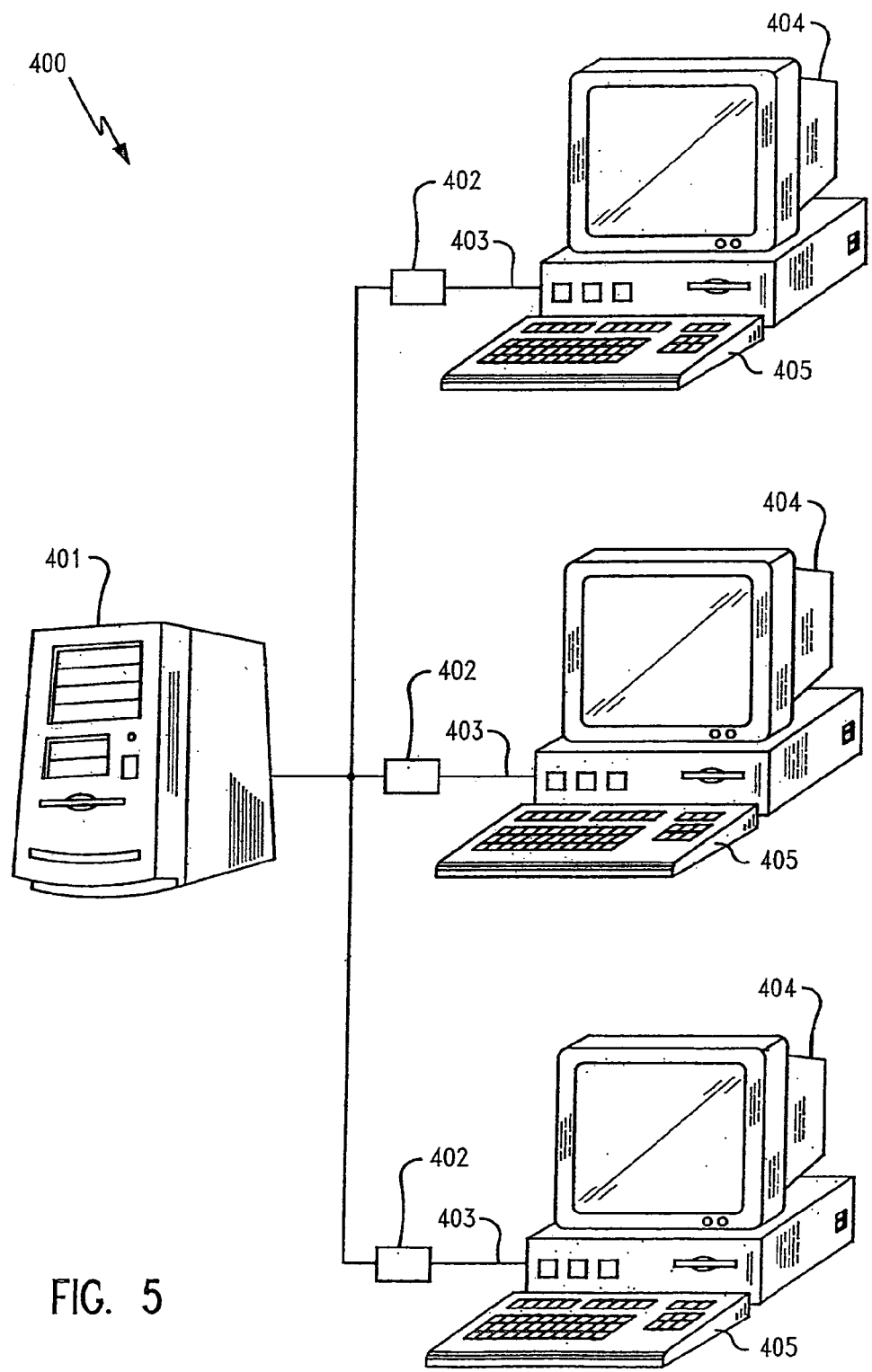
FIG. 5 is a schematic of the system architecture for the application process.

As shown in FIG. 5, the application software of the present invention may be performed on conventional stored-program computer architecture 400. A system unit generally includes processing, memory, mass storage devices such as disc and/or tape storage elements 401 and other elements, including network interface devices 402 for interfacing with the respective computer communications link 403. Video display units 404 permit the computer to display processed data and processing status to the operator. Operator input devices 405 allow the operator to input data and control processing by the computer. The computers transfer information in the form of messages through network interface devices among each other over various communication links.

Method for Deployment

While it is understood that the process software for autonomic building and updating of access control in email systems may be deployed by manually loading directly in the client, server, and proxy computers via loading a storage medium such as a CD, DVD, and the like, the process software may also be automatically or semi-automatically deployed into a computer system by sending the process software to a central server or a group of central servers. The process software is then downloaded and executed by client computers. Alternatively, the process software is sent directly to the client system via email. The process software is then either detached to a directory or loaded into a directory by a button associated with the email that executes a program on demand. The executed program detaches the process software into a directory. Another alternative is to send the process software directly to a directory on the client computer hard drive. When there are proxy servers, the process software will select the proxy server code, determine which computers to place the proxy servers' code, transmit the proxy server code, and install the proxy server code on the proxy computer. The process software is then transmitted to the proxy server and stored therein.

Figure 6A:
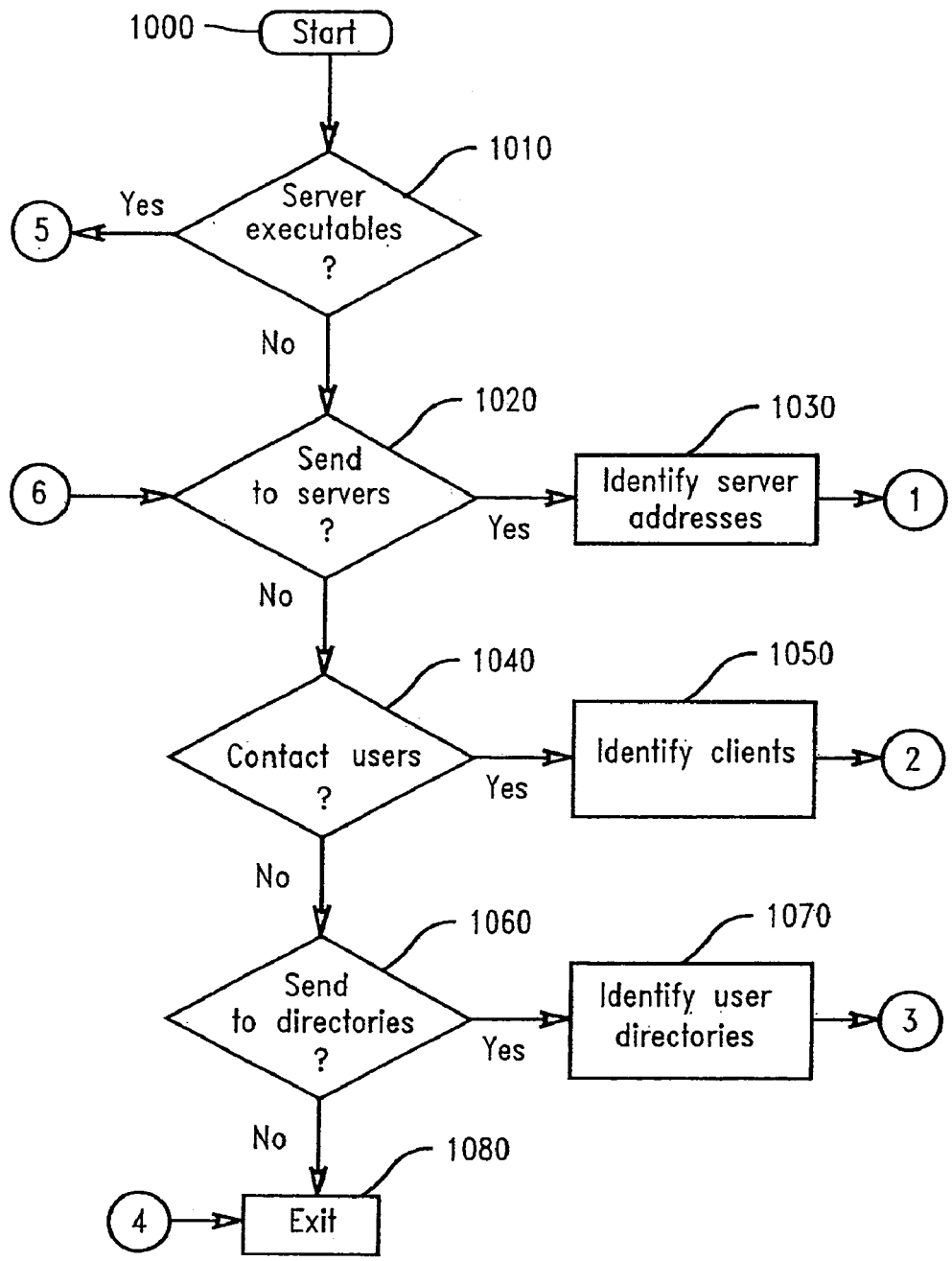
FIGS. 6A and 6B are flowcharts of the process flow for deployment of the process software.
Figure 6B:
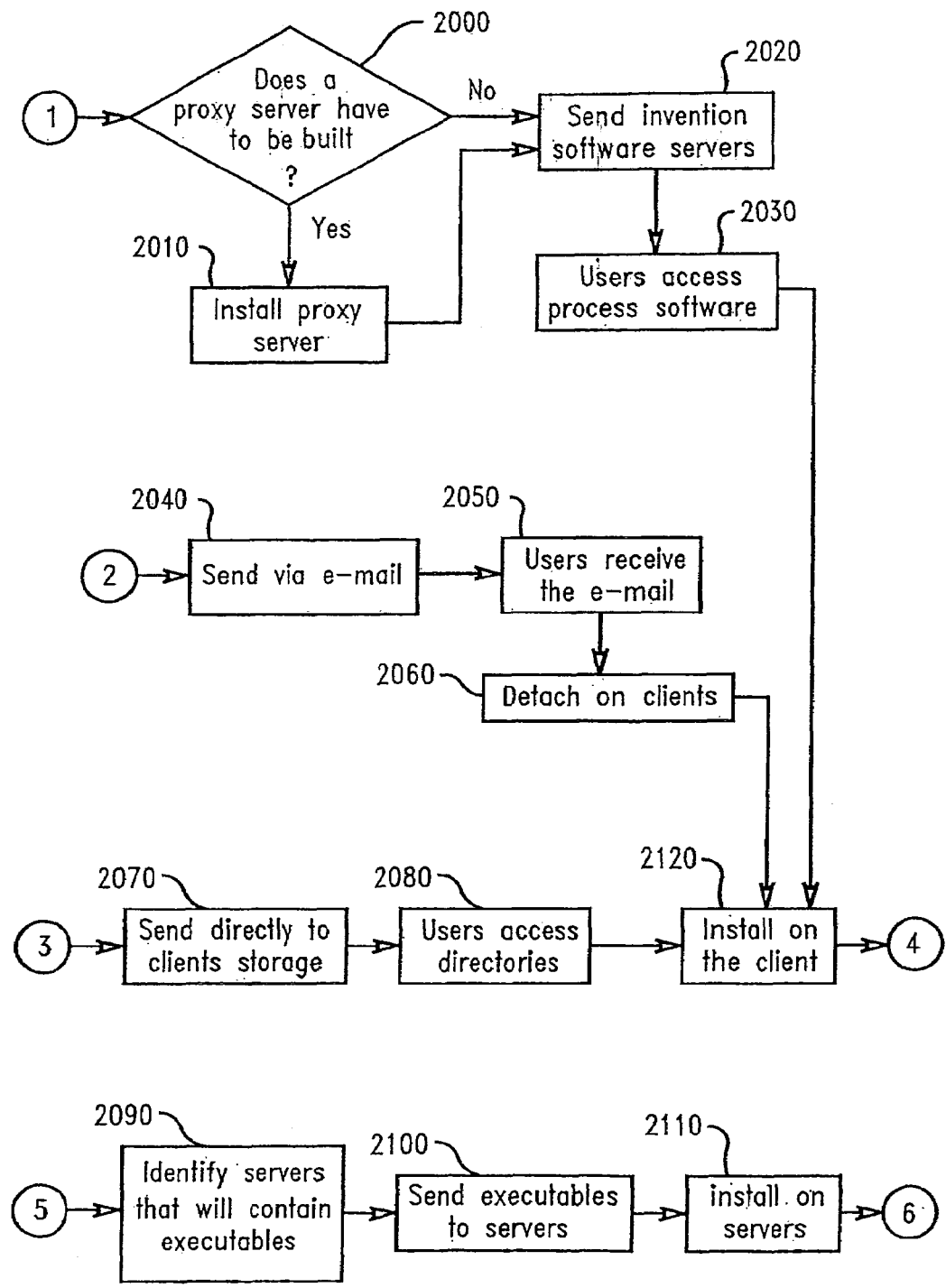

FIGS. 6A and 6B detail the process flow for deployment of the process software. Referring to FIGS. 6A and 6B, Step 1000 begins the deployment. First, a determination is made regarding any programs that will reside on a server or servers when the process software is executed 1010. If such programs exist, the servers that will contain the executables are identified 2090. The process software for the server or servers is transferred directly to the servers' storage via an established protocol, such as file transfer protocol (FTP), and the like, or by copying though the use of a shared file system 2100. The process software is then installed on the servers 2110.

Next, a determination is made on whether the process software is to be deployed by having users access the process software on a server or servers 1020. If the users are to access the process software on servers, server addresses are identified 1030 to store the process software.

It is then determined if it is necessary to build a proxy server 2000 to store the process software. A proxy server is a server that sits between a client application, such as a Web browser, and a real server. It intercepts all requests to the real server in an attempt to fulfill the requests itself. If it is not possible for the proxy server to fulfill the requests, then the proxy server will forward the request to the real server. The two primary benefits of a proxy server are to improve performance and to filter requests. If a proxy server is necessitated, then it is installed 2010. The process software is sent to the servers either via an established protocol, such as FTP, and the like, or it is copied directly from the source files to the server files via file sharing 2020.

In another embodiment, a transaction is sent to servers that contain the process software. The servers then process the transaction, and receive and copy the process software to the servers' file systems. Once the process software is stored at the servers, the users via their client computers access the process software on the servers and copy to their client computers file systems 2030. In a separate embodiment, the servers automatically copy the process software to each client and then run the installation program for the process software at each client computer. The user executes the program that installs the process software on his client computer 2120, and exits the process 1080.

In step 1040 determination is made whether the process software is deployed by sending the process software to users via e-mail. The set of users where the process software will be deployed are identified together with the addresses of the users' client computers 1050. The process software is sent via e-mail to each of the users' client computers. The users then receive the e-mail 2050 and detach the process software from the e-mail to a directory on their client computers 2060. Each user executes the program that installs the process software on his client computer 2120 and exits the process 1080.

Last, a determination is made as to whether the process software will be sent directly to users' directories on their client computers 1060. If it is sent, the user directories are identified 1070. The process software is transferred directly to each user's client computer directory 2070. This can be done in several ways, such as sharing of the file system directories and then copying from the sender's file system to the recipient user's file system, or alternatively using a transfer protocol such as FTP, and the like. The users access the directories on their client file systems in preparation for installing the process software 2080. The users execute the program that installs the process software on their client computer 2120, then exit the process 1080.

Method for Integration

The process software for autonomic building and updating of access control in email systems may be integrated into a client, server, and network environment by providing for the process software to coexist with applications, operating systems, or network operating systems software, and installing the process software on the clients and servers in an environment where the process software will function.

Initially, one must identify any software on the clients and servers, including the network operating system, where the process software will be deployed, that is required by the process software or that work in conjunction with the process software. This includes the network operating system or other software that enhances a basic operating system by adding networking features.

The software applications and version numbers are then identified and compared to a list of software applications validated to work with the process software. Those software applications that have not been validated for integration are subsequently upgraded. Program instructions that pass parameters from the process software to the software applications are checked to ensure the parameter lists match the parameter lists required by the process software. Conversely parameters passed from the software applications to the process software are checked to ensure the parameters match the parameters required by the process software. The client and server operating systems including the network operating systems are identified and compared to a list of operating systems, version numbers, or network software, all previously tested to work with the process software. Those operating systems, version numbers, and network software that do not match the list of tested operating systems and version numbers are subsequently upgraded to the required level on the clients and servers.

After ensuring that the software locale where the process software is to be deployed is at the correct version level validated to work with the process software, the integration is then completed by installing the process software on the clients and servers.

Figure 7A:
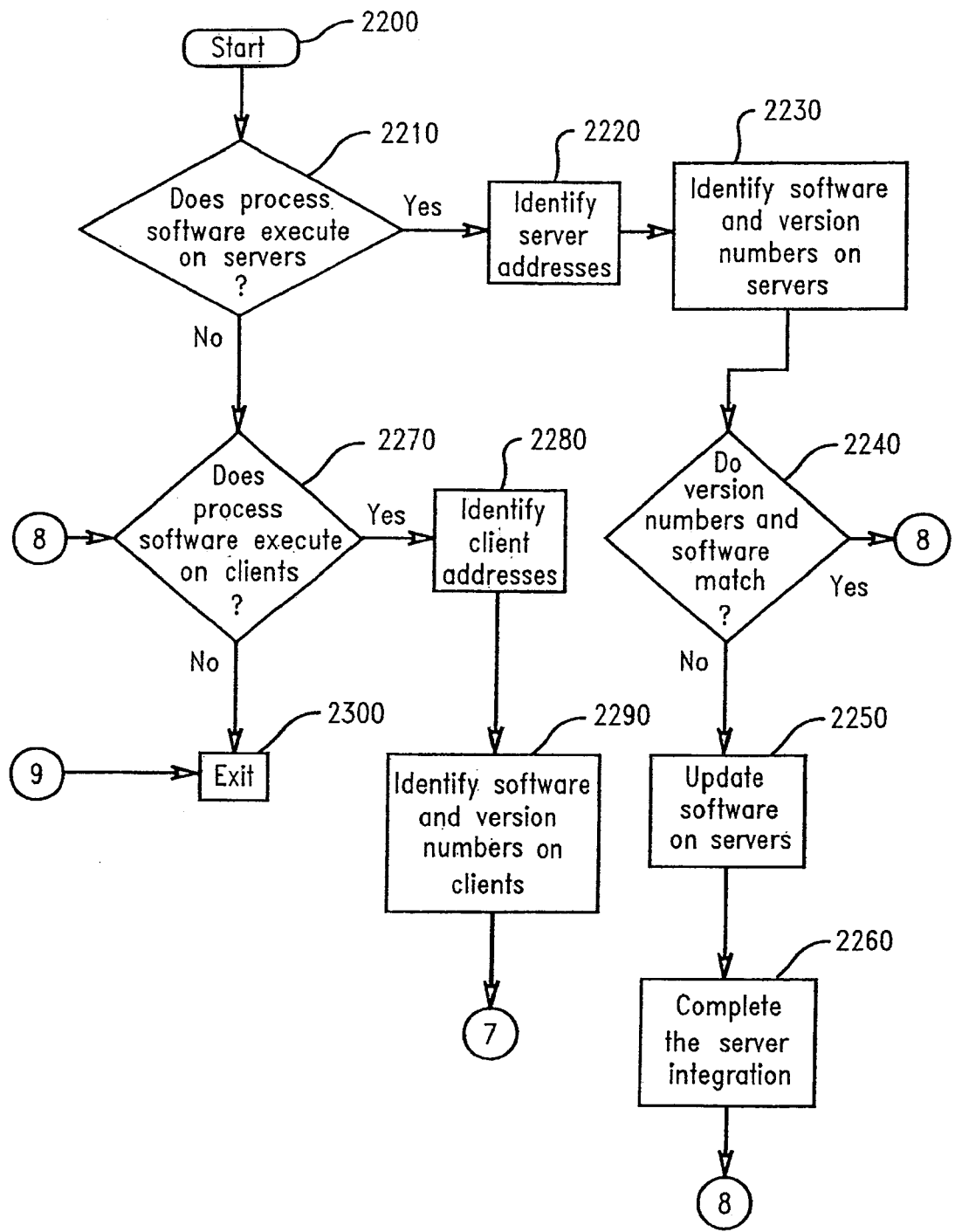
FIGS. 7A and 7B are flow charts of the process flow for integration of the software for autonomic building and updating of access control in email systems into a client, server, and network environment.
Figure 7B:
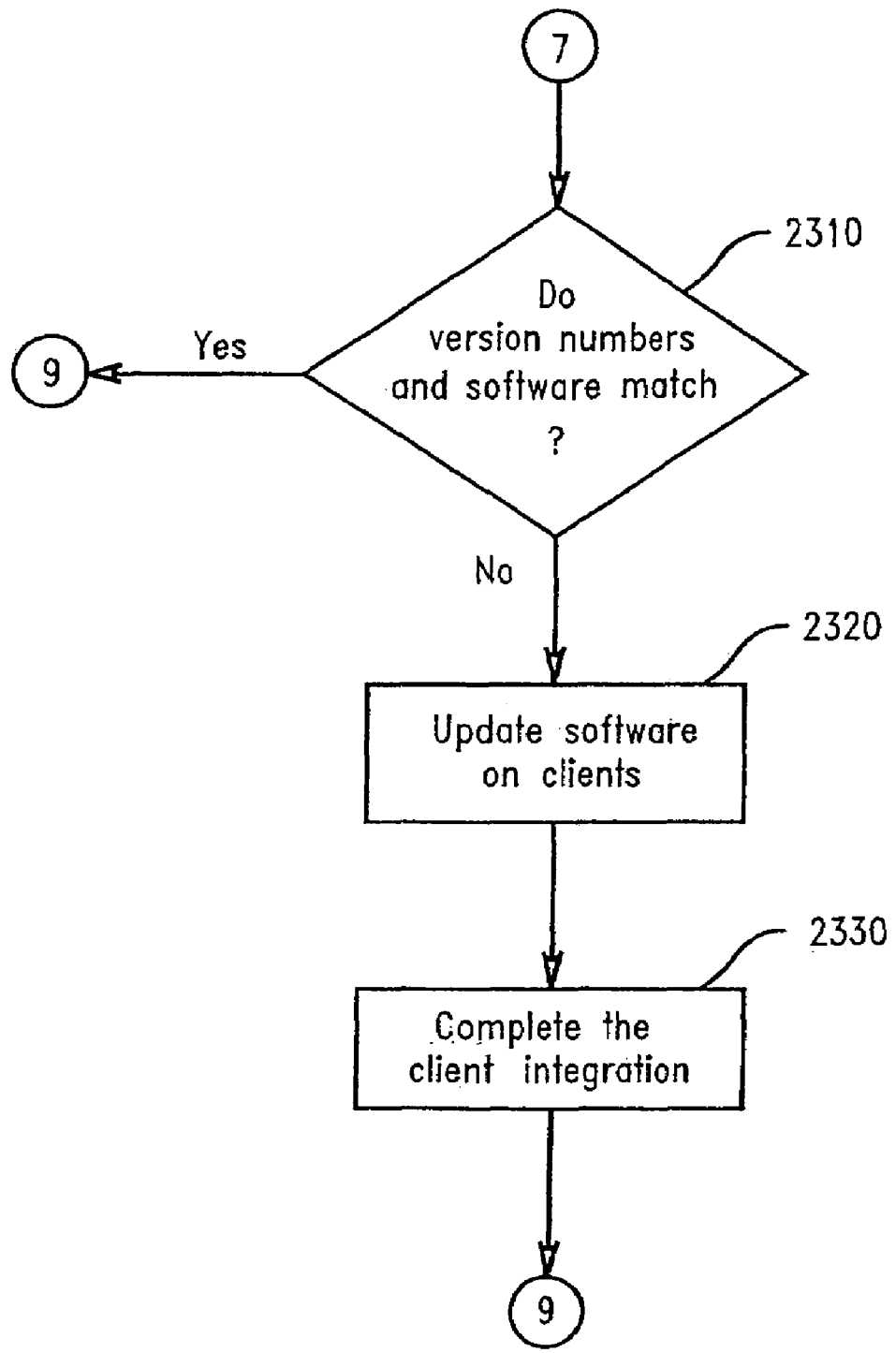

Referring to FIGS. 7A and 7B, step 2200 begins the integration of the process software. Initially, a determination is made regarding process software programs that will execute on a server or servers 2210. If this is the case, the server addresses are identified 2220. The servers are checked to see if they contain software that includes the operating system applications, or network operating systems (NOS), together with their version numbers, that have been validated with the process software 2230. The servers are also checked to determine if there is any missing software that is required by the process software 2230.

The version numbers are checked for a match to the version numbers of the operating system, applications, or network operating systems, validated with the process software 2240. If all of the versions match and there is no required software absent, the integration continues 2270. If one or more of the version numbers do not match, then the unmatched software versions are updated on the servers with the correct software versions 2250. Additionally, any missing software required for operation is updated on the servers 2250. Installing the process software 2260 completes the server integration.

A process step is initiated to see if there are any programs of the process software that will execute on the clients 2270. If no process software programs execute on the clients, the integration exits 2300. If software executes on the clients, the client addresses are identified 2280. The clients are checked for software that includes the operating system, applications, or network operating systems, together with their version numbers, validated with the process software 2290. The clients are also checked to determine if there is any missing software that is required by the process software 2290.

A determination is made as to whether the version numbers match the version numbers of the operating system, the applications, or network operating systems, validated with the process software 2310. If all of the versions match and there is no required software absent, the integration exits.

If one or more of the version numbers do not match, then the unmatched versions are updated on the clients with the correct versions 2320. In addition, if there is required software missing, it is also updated on the clients 2320. Installing the process software on the clients 2330 completes the integration.

On Demand Computing

Business importance of On Demand computing is increasingly becoming a desired attribute. The process software of the present invention for autonomic building and updating of access control in email systems is shared; simultaneously serving multiple customers in a flexible, automated fashion. It is standardized, requiring little customization, and is scalable, providing capacity on demand in a pay-as-you-go model.

The process software can be stored on a shared file system accessible from one or more servers. The process software is executed via transactions that contain data and server processing requests using CPU units on the accessed server. CPU units are units of time such as minutes, seconds, and hours on the central processor of the server. Additionally the assessed server may make requests of other servers that require CPU units. CPU units are an example that represents but one measurement of use. Other measurements of use include, but are not limited to, network bandwidth, memory usage, storage usage, packet transfers, and complete transactions.

When multiple customers use the same process software application, their transactions are differentiated by the parameters included in the transactions identifying a unique customer and the type of service for that customer. All of the CPU units and other measurements of use that are used for the services for each customer are recorded. When the number of transactions to any one server begins to affect the performance of that server, other servers are accessed to increase capacity and share the workload. Likewise when other measurements of use such as network bandwidth, memory usage, and storage usage, approach a capacity that affects performance, additional network bandwidth, memory usage, or storage, is added to share the workload.

The measurements of use for each service and customer are sent to a collecting server that sums the measurements of use for each customer. This is performed for each service that was processed anywhere in the network of servers that provides the shared execution of the process software. The summed measurements of use units are periodically multiplied by unit costs, and the resulting total process software application service costs are alternatively sent to the customer or indicated on a web site accessed by the customer, which then remits payment to the service provider.

In another embodiment, the service provider requests payment directly from a customer account at a banking or financial institution.

In yet another embodiment, if the service provider is also a customer of the customer that uses the process software application, the payment owed to the service provider is reconciled to the payment owed by the service provider to minimize the transfer of payments.

Figure 8A:
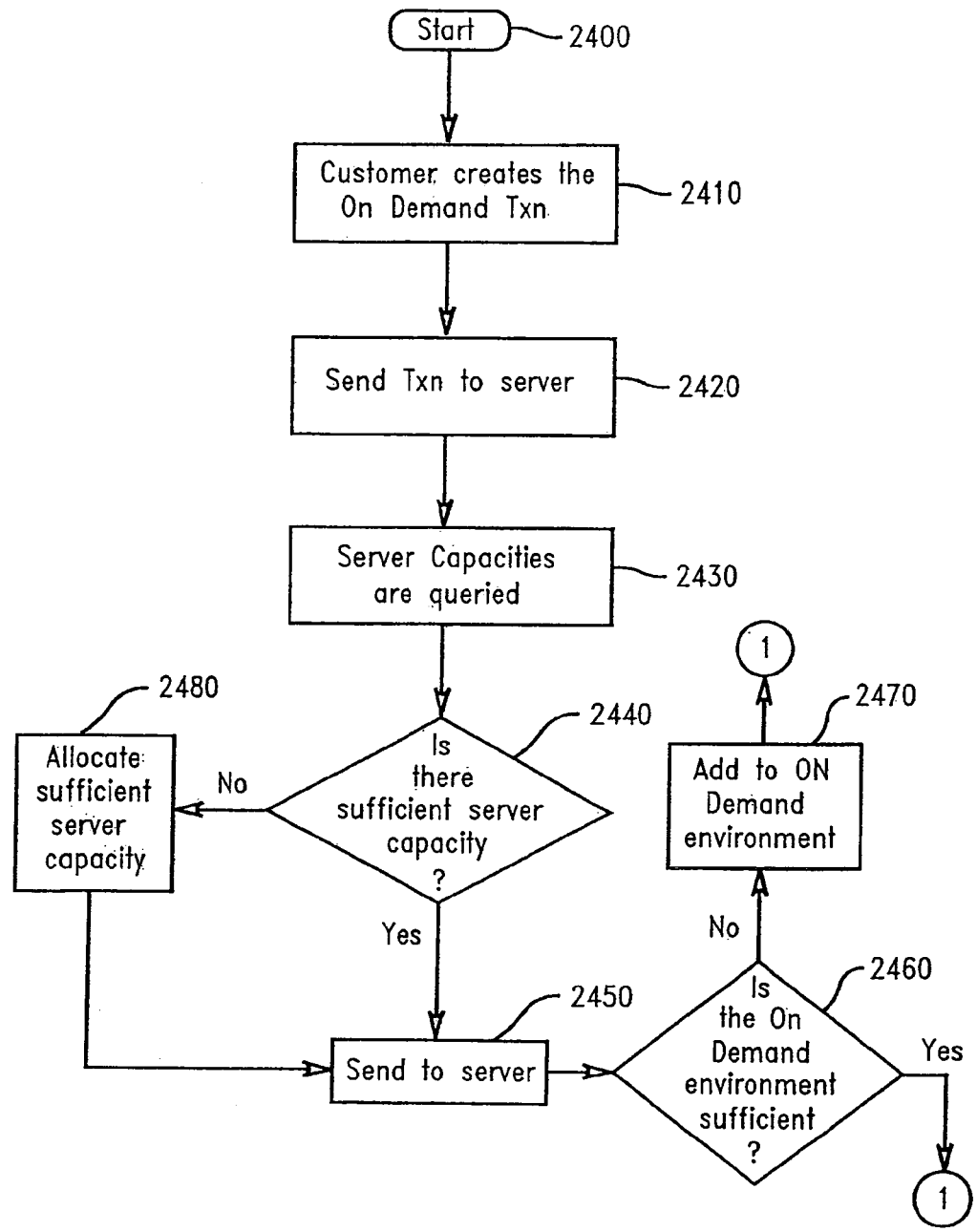
FIGS. 8A and 8B are flow charts of the process flow for sharing and simultaneously serving the process software of the present invention to multiple customers in an on demand format.
Figure 8B:
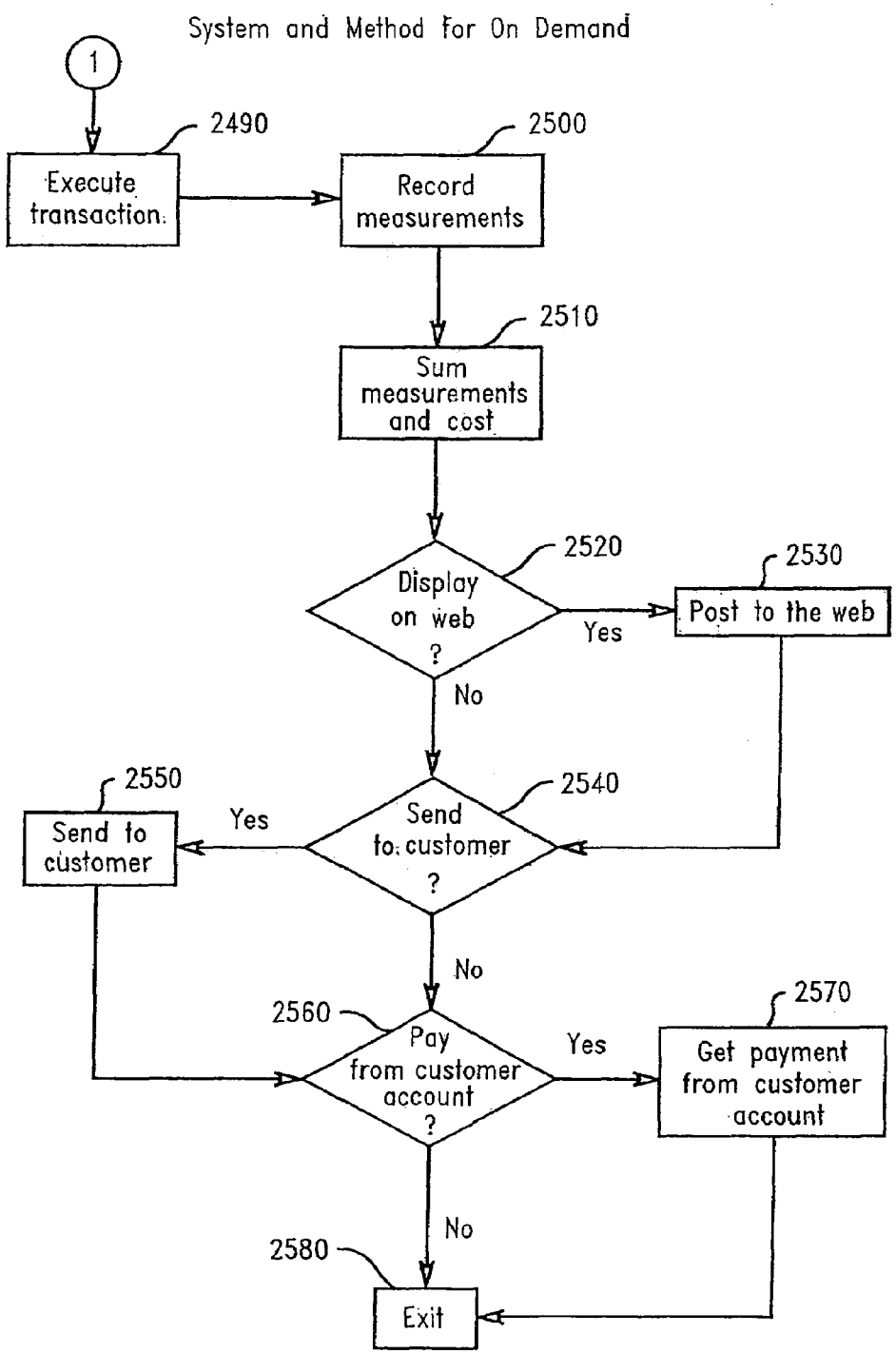

Referring to FIGS. 8A and 8B, the On Demand process commences at step 2400. A transaction is created containing the unique customer identification, the requested service type, and any service parameters that further specify the type of service 2410. The transaction is then sent to the main server 2420. In an On Demand environment, the main server can initially be the sole server, and then as capacity is consumed, other servers may be added. The server central processing unit (CPU) capacities in the On Demand environment are queried 2430. The CPU requirement of the transaction is estimated, and the servers' available CPU capacity is compared to the transaction CPU requirement to see if there is sufficient capacity in any server to process the transaction 2440. If there is not sufficient server CPU available capacity, then additional capacity is allocated to process the transaction 2480. If there is already sufficient CPU capacity available, the transaction is sent to a selected server 2450.

Before executing the transaction, a check is made of the remaining On Demand environment to determine if the environment has sufficient available capacity for processing the transaction. This environment capacity consists of such things as network bandwidth, processor memory, storage, and the like 2460. If there is not sufficient available capacity, capacity is added to the On Demand environment 2470. The required software to process the transaction is then accessed and loaded into memory. The transaction is then executed 2490.

The usage measurements are recorded 2500. The usage measurements consist of the portions of those functions in the On Demand environment that is used to process the transaction. The usage of such functions as network bandwidth, processor memory, storage and CPU cycles are recorded. The usage measurements are summed, multiplied by unit costs, and recorded as a charge to the requesting customer 2510.

On Demand costs may be posted to a web site 2530 if the customer has so requested. Or the customer may request 2540 that the On Demand costs be sent via e-mail to a customer address 2550. If the customer has requested that the On Demand costs be paid directly from a customer account 2560, then payment is received accordingly 2570.

Virtual Private Networks

The process software for autonomic building and updating of access control in email systems may be deployed, accessed, and executed through the use of a virtual private network (VPN), which is any combination of technologies that can be used to secure a connection through an otherwise unsecured or untrusted network. The use of VPNs is to improve security and to reduce operational costs. The VPN makes use of a public network, usually the Internet, to connect remote sites or users together. Instead of using a dedicated, real-world connection such as leased line, the VPN uses "virtual" connections routed through the Internet from the company's private network to a remote site. Access to the software via a VPN can be provided as a service by specifically constructing the VPN for purposes of delivery or execution of the process software, for example when the software resides elsewhere. The lifetime of the VPN may be limited to a given period of time or a given number of deployments based on an amount paid.

The process software may be deployed, accessed and executed through either a remote-access or a site-to-site VPN. When using remote-access VPNs the process software is deployed, accessed and executed via the secure, encrypted connections between a company's private network and remote users through a third-party service provider. The enterprise service provider (ESP) sets a network access server (NAS) and provides remote users with desktop client software for their computers. The telecommuters are then able to dial a toll-free number or attach directly via a cable or DSL modem in order to reach the NAS and use their VPN client software to access the corporate network and to access, download, and execute the process software.

When using the site-to-site VPN, the process software is deployed, accessed, and executed through the use of dedicated equipment and large-scale encryption that may be used to connect a company's multiple fixed sites over a public network such as the Internet.

The process software is transported over the VPN via tunneling which is the process of placing an entire packet within another packet and sending it over a network. The protocol of the outer packet is understood by the network and interface points, called tunnel interfaces, where the packet enters and exits the network.

Figure 9A:
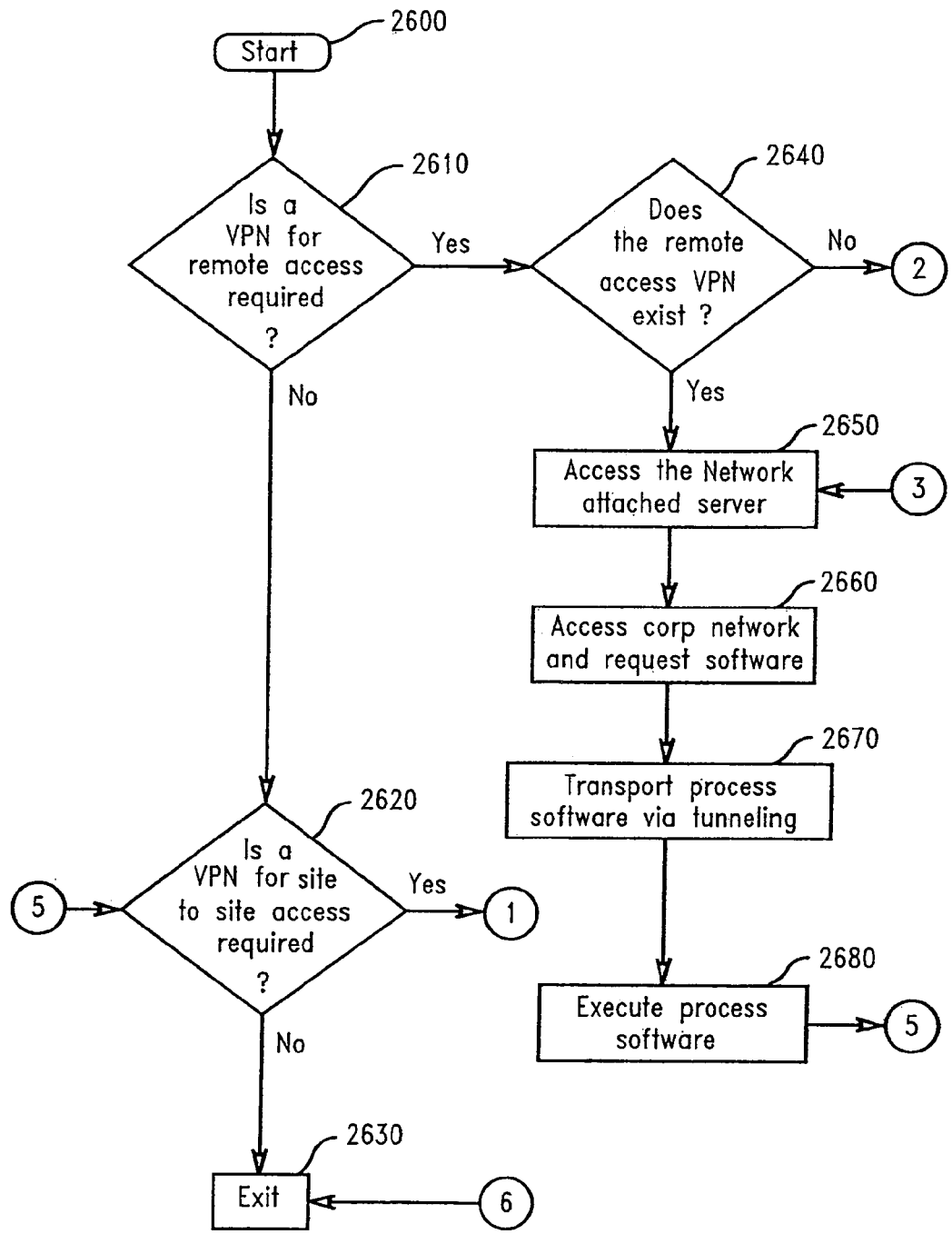
FIGS. 9A-9C are flow charts for deploying, accessing, and executing the process software through the use of a virtual private network.
Figure 9B:
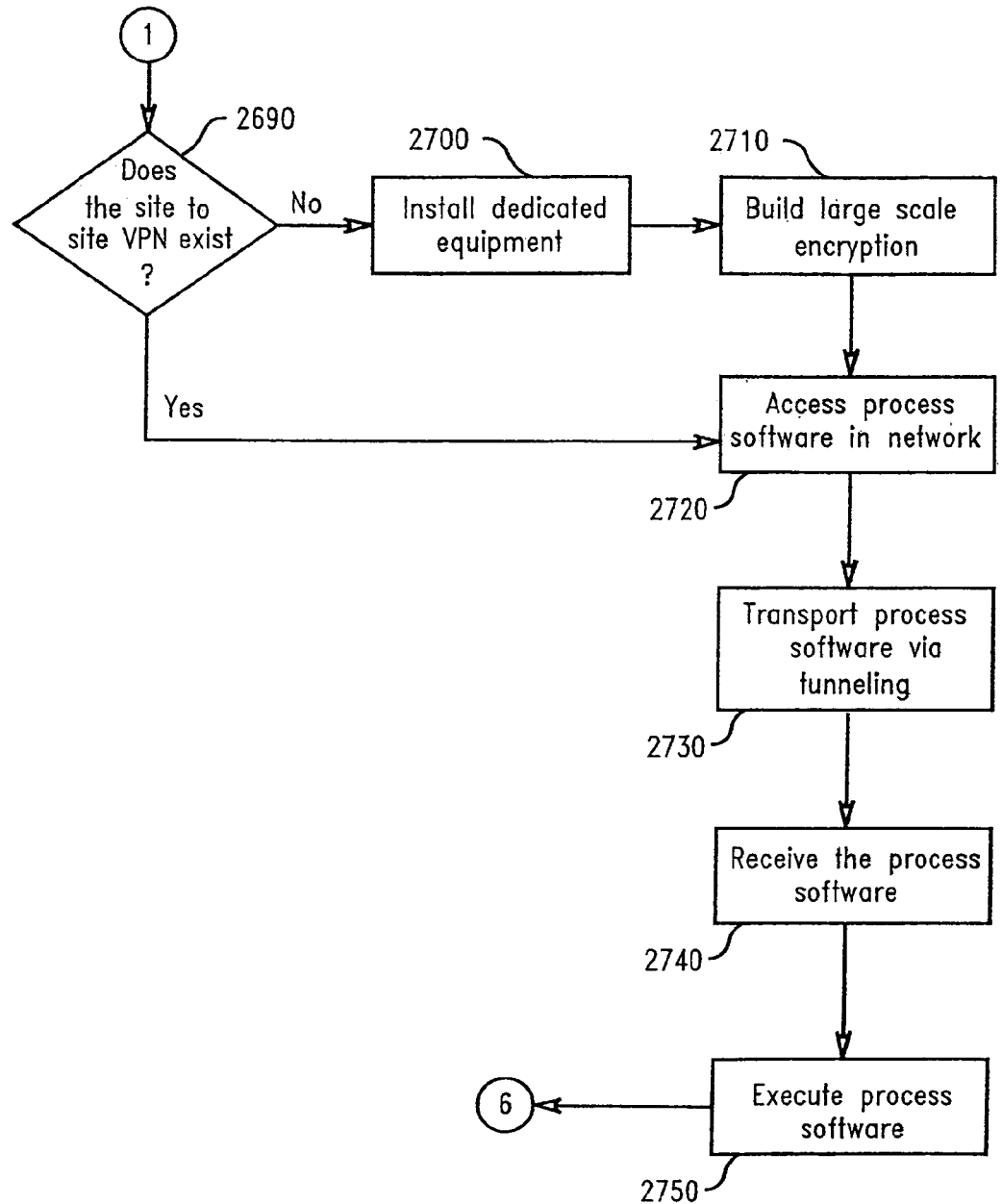
Figure 9C:
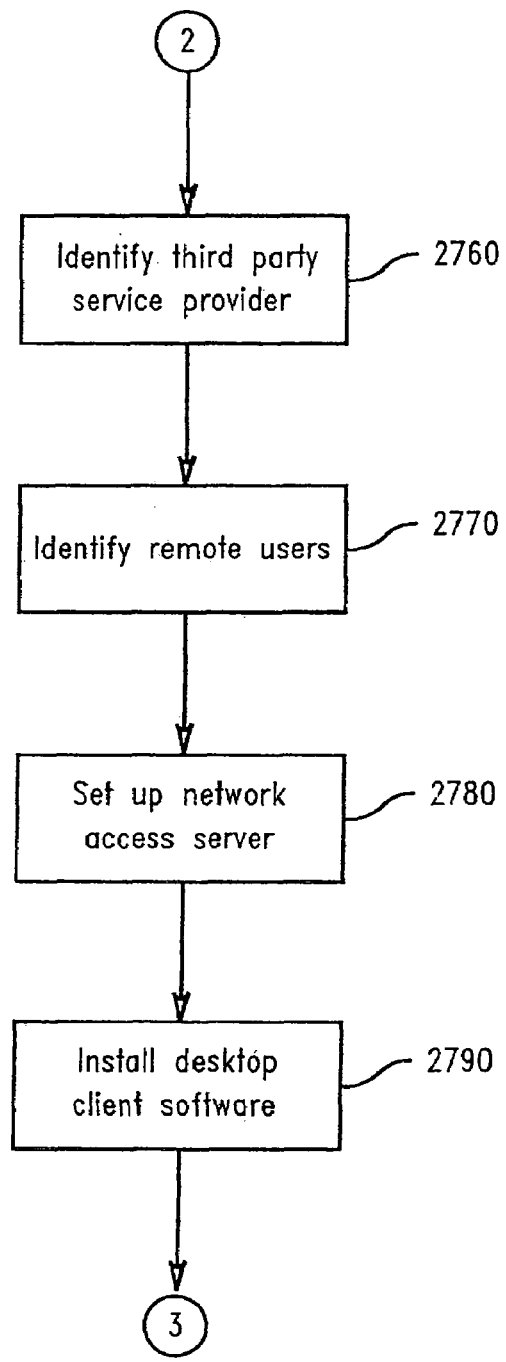

Referring to FIGS. 9A-9C, step 2600 begins the Virtual Private Network (VPN) process. A determination is made to see if a VPN for remote access is required 2610. If required, the system checks to see if a remote access VPN exists 2640. If one does not exist, a third party provider is identified that will provide the secure, encrypted connections between the company's private network and the company's remote users 2760. The company's remote users are identified 2770. The third party provider then sets up a network access server (NAS) 2780 that allows the remote users to dial a toll free number or attach directly via a cable or digital subscriber line (DSL) modem to access, download, and install the desktop client software for the remote-access VPN 2790.

After the remote access VPN has been built or if previously installed, the remote users may access the process software by dialing into the NAS or attaching directly via a cable or DSL modem into the NAS 2650. This allows entry into the corporate network where the process software is accessed 2660. The process software is transported to the remote user's desktop over the network via tunneling. The process software is divided into packets and each packet including the data and protocol is placed within another packet 2670. When the process software arrives at the remote user's desktop, it is removed from the packets, reconstituted and executed on the remote users desktop 2680.

When a VPN for remote access is not required, a determination is made to see if a VPN for site to site access is required 2620. If it is not required, the process exits 2630. Otherwise, determination of the site to site VPN is made 2690. If the site to site VPN does not exist, dedicated equipment required to establish a site to site VPN must be installed 2700. Large scale encryption is then built into the VPN 2710. After the site to site VPN has been built or if it had been previously established, the users access the process software via the VPN 2720. The process software is transported to the site users over the network via tunneling. That is the process software is received by being divided into packets, each packet including the data and protocol placed within another packet 2740. When the process software arrives at the remote user's desktop, it is removed from the packets, reconstituted, and executed on the site users desktop 2750.

Autonomic building and updating of access control in email systems is possible through the implementation of the present application. Software that is capable of performing the functional steps described in FIGS. 1-3 will allow an originator to be informed of the recipients that were not on the originator's initial access list through a selective dissemination process whereby the originator delegates selection of second tier recipients to the discretion of the first tier recipients, and then authorizes the level of access control for each recipient. The originator is also able to track the dissemination trail of reviewers, so that the originator can more accurately assess the valued perception of the information by others.

While the present invention has been particularly described, in conjunction with a specific preferred embodiment, it is evident that many alternatives, modifications and variations will be apparent to those skilled in the art in light of the foregoing description. It is therefore contemplated that Thus, having described the invention, what is claimed is:

1. A method of autonomic building and updating access control for referenced databases in documents sent via email by an originator to addressees, comprising:

dynamically updating an access control list of said addressees for said originator of said email; tracking distribution routes of said documents in a repository;

providing a request to said originator and a response from said originator to any of said addressees for approving, altering, or rejecting the access of said referenced databases in said documents; and deploying process software for updating access control for referenced databases in documents sent via email by an originator to addressees, said deployment comprising:

installing said process software on at least one server; identifying server addresses for users accessing said process software on said at least one server;

installing a proxy server if needed;

sending said process software to said at least one server via a file transfer protocol, or sending a transaction to said at least one server containing said process software and receiving and copying said process software to said at least one server's file system;

accessing said process software on a user's client computer file system; and executing said process software by said users.

2. The method of claim 1 wherein said step of installing said process software further comprises:

determining if programs will reside on said at least one server when said process software is executed;

identifying said at least one server that will execute said process software; and transferring said process software to said at least one server's storage.

3. The method of claim 1 wherein said step of accessing said process software includes having said at least one server automatically copying said process software to each client computer, running an installation program at each client computer, and executing said installation program on said client computer.

4. The method of claim 1 wherein sending said process software to said users via email further comprises identifying said users and addresses of said client computers.

5. The method of claim 1 wherein said step of executing said process software by said users includes sending said process software to directories on said client computers.

6. The method of claim 1 wherein said step of accessing said process software comprises sending said process software to users via email.

7. A method of autonomic building and updating access control for referenced databases in documents sent via email by an originator to addressees, comprising:

dynamically updating an access control list of said addressees for said originator of said email; tracking distribution routes of said documents in a repository; and providing a request to said originator and a response from said originator to any of said addressees for approving, altering, or rejecting the access of said referenced databases in said documents; and integrating process software for updating access control for referenced databases in documents sent via email by an originator to addressees, said integration comprising:

determining if said process software will execute on at least one server;

identifying said at least one server address, including checking said at least one server for operating systems, applications, network operating systems, or version numbers for validation with said process software, and identifying any missing software applications that are required for integration;

updating said operating systems, said applications, or said network operating systems that are not validated for said process software, and providing any of said missing software applications required for said integration;

identifying client addresses and checking said client's computers for operating systems, applications, network operating systems, or version numbers for validation with said process software, and identifying any missing software applications that are required for integration;

updating said client's computers with said operating systems, said applications, or said network operating systems that are not validated for said process software, and providing any of said missing software applications required for said integration; and installing said process software on said client's computers and said at least one server.

8. A method of autonomic building and updating access control for referenced databases in documents sent via email by an originator to addressees, comprising:

dynamically updating an access control list of said addressees for said originator of said email; tracking distribution routes of said documents in a repository; and providing a request to said originator and a response from said originator to any of said addressees for approving, altering, or rejecting the access of said referenced databases in said documents; and on demand sharing of process software for updating access control for referenced databases in documents sent via email by an originator to addressees, said on demand sharing comprising:

creating a transaction containing unique customer identification, requested service type, and service parameters;

sending said transaction to at least one main server;

querying said server's central processing unit capacity for adequate processing of said transaction; and allocating additional central processing unit capacity when additional capacity is needed to process said transaction, and adding said additional central processing unit capacity to said server, or checking environmental capacity for processing said transaction, including network bandwidth, processor memory, or storage, and allocating said environmental capacity as required.

9. The method of claim 8 further comprising recording usage measurements including network bandwidth, processor memory, storage, or said central processing unit cycles.

10. The method of claim 8 further comprising summing said usage measurements, acquiring a multiplicative value of said usage measurements and unit costs, and recording said multiplicative value as an on demand charge to a requesting customer.

11. The method of claim 8 further comprising posting said on demand charge on a web site if requested by said requesting customer, or sending said demand charge via email to said requesting customer's email address.

12. The method of claim 8 further comprising charging said on demand charge to said requesting customers account if an account exists and said requesting customer selects a charge account payment method.

13. A method of autonomic building and updating access control for referenced databases in documents sent via email by an originator to addressees, comprising:
dynamically updating an access control list of said addressees for said originator of said email; tracking distribution routes of said documents in a repository; and
providing a request to said originator and a response from said originator to any of said addressees for approving, altering, or rejecting the access of said referenced databases in said documents; and
deploying, accessing, and executing process software for updating access control for referenced databases in documents sent via email by an originator to addressees through a virtual private network, said method further comprising:
determining if said virtual private network is required;
checking for remote access of said virtual private network;
if said remote access does not exist, identifying a third party provider to provide secure, encrypted connections between a private network and remote users, identifying said remote users, and setting up a network access server for downloading and installing desktop client software for remotely accessing said virtual private network;
accessing said process software;
transporting said process software to said remote user's desktop; and
executing said process software on said remote user's desktop.

14. The method of claim 13 further comprising:
determining if said virtual private network is available for site-to-site access, or installing equipment required to establish said site-to-site virtual private network, and installing large scale encryption into said virtual private network; and
accessing said process software on said site-to-site configuration.

15. The method of claim 13 wherein said step of accessing said process software further comprises dialing into said network access server or attaching directly via a cable or DSL modem into said network access server.

* * * * *